United States Patent Office 3,787,349
Patented Jan. 22, 1974

3,787,349
COLD-SETTING ROAD-MARKING MATERIAL
Arne Lennart Eliasson, Hassleholm, Sweden, assignor to Svenska AB Cleansol, Kristianstad, Sweden
No Drawing. Filed Feb. 9, 1972, Ser. No. 224,931
Claims priority, application Sweden, Feb. 10, 1971, 1,629/71
Int. Cl. C08g 51/04
U.S. Cl. 260—37 EP      9 Claims

ABSTRACT OF THE DISCLOSURE

A cold-setting, sprayable and extrudable road-marking material consisting of binder, pigment, filler and aggregate, said binder being constituted by a curable epoxy resin, hardener and, if desired, accelerator and plasticizer.

Present road-marking materials generally consist of alkyd-based and/or rubber/solvent-based paint which is applied in the form of a film having a thickness in the dry state of 200–300 microns and which is capable only for a short time of serving its purpose and which besides has a relatively long drying time, or of thermoplastic masses comprising an aggregate of preferably sand or quartz (silicon dioxide), pigment, for instance $TiO_2$, for coloring the material, a binder which generally is a thermoplastic resinous material holding the mixture together, and a filler to improve the dispersion of the binder and to serve as an extender. If desired, part of the aggregate may consist of glass beads having a diameter of not more than 1.5 mm. and intended to reflect incident light substantially in the direction from which it came.

The prevailing binder types in present road-marking materials are the above-mentioned thermoplastic binders. Such thermoplastic road-marking materials suffer from several serious shortcomings, for instance their dependence upon the ambient temperature when laid so that laying should not be carried out at temperatures below 10° C. Moreover, they must be heated to relatively high temperature (nearly 150° C.) before they melt and can be handled for laying. Owing to their viscous character in the molten state they frequently cannot be sprayed but must be laid by spreading or flowing on the surface, for instance in a box. They have a long setting time and become soft again when the temperature rises, for instance on hot summer days. If glass beads are added to the material in connection with the laying, i.e. after the laying but before the material has set, the viscous character of the material will cause the glass beads to stay on the surface of the material. As the glass beads should be uniformly distributed throughout the road-marking material so that, when the material gradually wears off, there will still remain glass beads reflecting incident light, it has been tried instead to admix the glass beads to the mass already before laying. With sprayable compositions, however, this results in a heavy wear of the devices which are used for the laying, primarily the spraying nozzle. For this reason, it is frequently preferred to apply the glass beads in connection with the laying, in spite of the disadvantage that the glass beads will occur only in the surface layer of the material.

To eliminate some of the disadvantages of thermoplastic road-marking materials, it has been tried to use for the binder methyl methacrylate which is hardened by means of a peroxide hardener. However, this brings no satisfactory solution of the problem since the methyl methacrylate binder has a setting time of more than 20 minutes at 20° C., and during laying the road sections concerned must therefore be closed for considerable time. Moreover, the temperature raised by the exothermal heat developed during setting amounts to not more than 70° C., and therefore the material is bonded to the roadway by tackiness alone.

It has now been surprisingly discovered that the above-mentioned shortcomings can be eliminated, and that an excellent road-marking material can be obtained which is sprayable and through setting hardens very quickly also at low temperatures and forms a wear-resistant, temperature-insensitive material, by using a binder consisting of epoxy resin. The characteristic features of the present invention will appear from the appended claims.

The epoxy resin binders of the present invention can be made to set during a period of time varying from 10 seconds to about 15 minutes, preferably about 5–10 minutes, at an ambient temperature of at least 8° C. If the temperature of the binder composition is raised to 40–50° C., setting occurs at a temperature as low as −2.5° C. It will thus be obvious that the road-marking material of the present invention is more independent of the ambient temperature than the road-marking materials hitherto employed. Moreover, because of the short setting time of the road-marking material of the present invention, the road or sections thereof need not be closed when the material is being laid, and the temporary "closing" caused by the laying vehicle and an escort vehicle following immediately behind, is quite sufficient. The costs and the time required for setting up and removing warning markers as well as the danger connected therewith are thus avoided. One also saves personnel since only one man is required for the laying vehicle and one man for the escort vehicle.

Moreover, it is possible to distribute the glass beads throughout the material, although the glass beads are applied in connection with the laying. The reason is that the material of the present invention is relatively non-viscous before it has set, and the glass beads therefore have time to penetrate into the material so that they will be uniformly distributed therein when the material has set and is hard.

There is also obtained an excellent bond to the base (asphalt) with the road-marking material of this invention because the setting reaction is highly exothermal so that a temperature of about 200° C. is obtained during setting. At this high temperature, the asphalt in the boundary layer adjacent the road-marking material melts, and after setting an excellent bond to the road-marking material is obtained. Setting takes but a few seconds.

A further advantage of the road-marking material according to the present invention is that the layer applied can be as thin as 1 mm. to obtain maximum reflection and to obtain the same wear resistance as with earlier thermoplastic materials which are laid in thicknesses of from 1.5 to 3 mm. Of the epoxy resins according to the invention, the following have proved particularly advantageous:

(a) Aliphatic epoxy resin having an approximate epoxy equivalent weight of 140–170, for instance Epikote® 160 and 162 available from AB Svenska Shell, Stockholm (the epoxy equivalent weight is the number of grams of resin containing 1 gram equivalent of epoxy);

(b) Cycloaliphatic epoxy resin having an approximate epoxy equivalent weight of 130–220, for instance Epikote® 171, 172 and 173 available from AB Svenska Shell, Stockholm;

(c) Condensation resin of epichlorohydrin and bisphenol A having an epoxy equivalent weight of approximately 180–240, for instance Epikote® 827 and 828 available from AB Svenska Shell, Stockholm, in mixture with (a) and/or (b), above;

(d) Glycidyl ester cycloaliphatic epoxy resin having an approximate epoxy equivalent weight of 150–170, for instance Epikote® 191 available from AB Svenska Shell, Stockholm, in mixture with one or more of the resins (a)–(c), above;

(e) Condensation resin of epichlorohydrin and glycerin having an approximate epoxy equivalent weight of 140–200, for instance Epikote® 812 available from AB Svenska Shell, Stockholm, in mixture with one or more of the resins (a)–(d), above.

It has been found that suitable hardeners for the above-mentioned resins are boron trifluoride-based hardeners, especially a modified $BF_3$ complex having a high molecular weight (Ancaflex 150 from Anchor Chemical Company Ltd., Manchester, Great Britain) and a modified $BF_3$/amine complex (Anchor 1170 and 1171 from Anchor Chemical Company Ltd., Manchester, Great Britain). However, also other conventional hardeners may be used, such as diethylene triamine (DTA), ethylene diamine (EDA), aromatic diamines, such as diaminodiphenyl methane (DDM), methaphenylene diamine (MDP), etc. In addition, it is possible to add to these hardeners in known manner accelerators of different kinds. As is already known, it is, of course, also possible to add various plasticizers to modify the resin/hardener composition.

The invention is further illustrated by the following examples. For the sake of clarity, these examples merely state the composition of the binder, but it should be noted that the sprayable road-marking material of the present invention has the same general composition as has been stated in the introduction for prior art materials, in that the binder, pigment and filler are applied by spraying, whereupon aggregate and, if desired, glass beads are added after the laying but before the material has set. Naturally, the laying can also be carried out by extrusion, and in that case also the aggregate and the glass beads may be included in the material. As an example of the binder:pigment ratio, it may be mentioned that the sprayable composition may contain up to 45% binder, preferably 25–45%, the balance being pigment and filler.

The following examples of pigmentation in connection with the material of this invention are given:

White pigmentation:

| | G. |
|---|---|
| Titanium dioxide | 100 |
| Calcium carbonate (Finncarb 6010 from Karl Forsström AB, Finland) | 150 |
| Silicon dioxide (Silimicron 10 from Quarzwerke G.m.b.H, Köln, Federal Republic of Germany) | 200 |

Fluorescent pigmentation:

(a)

| | |
|---|---|
| BASF-T-Orange 66 (fluorescent pigment from Badische Anilin- & Soda-Fabrik AG, Federal Republic of Germany) | 213 |

(b)

| | |
|---|---|
| Radglo P–1700 (fluorescent pigment from Radiant Color, California, USA) | 213 |

(c)

| | |
|---|---|
| Radglo P–1700 | 140 |
| Titanium dioxide | 73 |

In this connection, it should be noted that for fluorescent paint it is generally necessary to use, in addition to said fluorescent paint, a light so-called ground color to produce fluorescence. However, this is not necessary with the present invention since the resins in themselves refract and reflect incident light so that fluorescence is obtained under the action of the fluorescent paint when the light again leaves the resin.

In order to establish that setting was complete, all compositions in the following examples were tested after setting by heating to 120° C. For all compositions, the results were positive.

Using the compositions according to Examples 5–10 results in more flexible final products.

EXAMPLE 1

| | G. |
|---|---|
| Cycloaliphatic epoxy resin (Epikote® 171) | 426 |
| Hardener (Anchor 1171) | 21 |

EXAMPLE 2

| | G. |
|---|---|
| Cycloaliphatic epoxy resin (Epikote® 173) | 426 |
| Hardener (Anchor 1171) | 21 |

EXAMPLE 3

| | G. |
|---|---|
| Cycloaliphatic epoxy resin (Epikote® 171) | 284 |
| Epichlorohydrin/bisphenol A condensation resin (Epikote® 828) | 142 |
| Hardener (Anchor 1171) | 21 |

EXAMPLE 4

| | G. |
|---|---|
| Cycloaliphatic epoxy resin (Epikote® 171) | 284 |
| Epichlorohydrin/bisphenol A condensation resin (Epikote® 828) | 142 |
| Hardener (Anchor 1171) | 14 |
| Hardener (Ancaflex 150) | 7 |

EXAMPLE 5

| | G. |
|---|---|
| Cycloaliphatic epoxy resin (Epikote® 171) | 426 |
| Hardener (Anchor 1171) | 14 |
| Hardener (Ancaflex 150) | 7 |

EXAMPLE 6

| | G. |
|---|---|
| Cycloaliphatic epoxy resin (Epikote® 173) | 426 |
| Hardener (Anchor 1171) | 14 |
| Hardener (Ancaflex 150) | 7 |

EXAMPLE 7

| | G. |
|---|---|
| Cycloaliphatic epoxy resin (Epikote® 171) | 213 |
| Cycloaliphatic epoxy resin (Epikote® 173) | 213 |
| Hardener (Anchor 1171) | 21 |

EXAMPLE 8

| | G. |
|---|---|
| Aliphatic epoxy resin (Epikote® 162) | 213 |
| Cycloaliphatic epoxy resin (Epikote® 171) | 213 |
| Hardener (Anchor 1171) | 21 |

EXAMPLE 9

| | G. |
|---|---|
| Aliphatic epoxy resin (Epikote® 162) | 213 |
| Cycloaliphatic epoxy resin (Epikote® 173) | 213 |
| Hardener (Anchor 1171) | 25 |

EXAMPLE 10

| | G. |
|---|---|
| Aliphatic epoxy resin (Epikote® 162) | 213 |
| Cycloaliphatic epoxy resin (Epikote® 171) | 213 |
| Hardener (Anchor 1171) | 14 |
| Hardener (Ancaflex 150) | 7 |

EXAMPLE 11

| | G. |
|---|---|
| Cycloaliphatic epoxy resin (Epikote® 173) | 213 |
| Glycidyl ester cycloaliphatic epoxy resin (Epikote® 191) | 213 |
| Hardener (Anchor 1171) | 21 |

EXAMPLE 12

| | G. |
|---|---|
| Cycloaliphatic epoxy resin (Epikote® 173) | 142 |
| Glycidyl ester cycloaliphatic epoxy resin (Epikote® 191) | 142 |
| Epichlorohydrin/bisphenol A condensation resin (Epikote® 828) | 142 |
| Hardener (Anchor 1171) | 21 |

EXAMPLE 13

| | G. |
|---|---|
| Cycloaliphatic epoxy resin (Epikote® 171) | 284 |
| Epichlorohydrin/glycerin condensation resin (Epikote® 812) | 142 |
| Hardener (Anchor 1171) | 21 |

What I claim and desire to secure by Letters Patent is:

1. In a cold-set road-marking material consisting of pigment, filler, aggregate and a binder derived from curable resin, hardener and optionally accelerator and plasticizer, the improvement of using as the curable resin an epoxy resin comprising at least one resin chosen from the group consisting of aliphatic epoxy resins having an epoxy equivalent weight of 140–170 and cycloaliphatic epoxy resins having an epoxy equivalent weight of 130–220.

2. A road-marking material as claimed in claim 1 characterized in that the curable resin besides contains an epichlorohydrin/bisphenol A condensation resin having an epoxy equivalent weight of 180–240.

3. A road-marking material as claimed in claim 1, characterized in that the curable resin besides contains a glycidyl ester cycloaliphatic epoxy resin having an epoxy equivalent weight of 150–170.

4. A road-marking material as claimed in claim 1, characterized in that the curable resin besides contains a condensation resin of epichlorohydrin and glycerin having an epoxy equivalent weight of 140–200.

5. A road-marking material as claimed in claim 1, characterized in that the hardener consists of a $BF_3$-based hardener in the form of a modified $BF_3$ or $BF_3$/amine complex.

6. A road-marking material as claimed in claim 1, characterized in that the pigment wholly or partly consists of fluorescent paint.

7. A road-marking material as claimed in claim 1, characterized in that part of the aggregate consists of glass beads.

8. A road-marking material as claimed in claim 1, characterized in that it has a setting time of between 10 seconds and 15 minutes.

9. The method of marking roadways comprising applying to the roadway a composition consisting of pigment, filler aggregate and a binder derived from curable resin, hardener and optionally accelerator and plasticizer, wherein the curable resin is an epoxy resin comprising at least one resin selected from the group consisting of aliphatic epoxy resins having an epoxy equivalent weight of 140–170 and cycloaliphatic epoxy resins having an equivalent weight of 130–120.

References Cited

UNITED STATES PATENTS

| 2,952,192 | 9/1960 | Nagin | 260—37 EP X |
| 3,634,322 | 1/1972 | Ruf et al. | 260—37 EP X |
| 3,203,920 | 8/1965 | Nikles et al. | 260—830 TW X |
| 3,379,653 | 4/1968 | Pfeffingen et al. | 260—830 TW X |
| 2,897,733 | 8/1959 | Shuger | 260—37 EP X |

OTHER REFERENCES

Lee et al.: Handbook of Epoxy Resins; McGraw-Hill Book Co.; 1967; pp. 11-2, 11-3.

LEWIS T. JACOBS, Primary Examiner

U.S. Cl. X.R.

260—830 TW